(12) United States Patent
Takai

(10) Patent No.: US 7,178,260 B2
(45) Date of Patent: Feb. 20, 2007

(54) MEASURING HEAD

(75) Inventor: Nozomi Takai, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 11/455,814

(22) Filed: Jun. 20, 2006

(65) Prior Publication Data

US 2006/0230820 A1    Oct. 19, 2006

(51) Int. Cl.
*G01B 7/12* (2006.01)

(52) U.S. Cl. .......................................... 33/807

(58) Field of Classification Search ............... 33/807, 33/808

See application file for complete search history.

(56) References Cited

U.S. PATENT DOCUMENTS

| | | | |
|---|---|---|---|
| 4,035,922 A | 7/1977 | Von Voros | 33/784 |
| 4,279,079 A | 7/1981 | Gamberini et al. | 33/783 |
| 4,845,646 A | 7/1989 | Marquis et al. | 702/162 |
| 5,454,175 A * | 10/1995 | Li | 33/797 |
| 5,537,754 A * | 7/1996 | Bachmann et al. | 33/787 |
| 6,019,664 A * | 2/2000 | Tsai et al. | 451/11 |
| 6,295,866 B1 * | 10/2001 | Yamamoto et al. | 73/105 |
| 6,920,698 B2 * | 7/2005 | Dall'Aglio et al. | 33/551 |

FOREIGN PATENT DOCUMENTS

JP    53-76483    7/1978

* cited by examiner

*Primary Examiner*—Robert Raevis
(74) *Attorney, Agent, or Firm*—Harness, Dickey & Pierce, P.L.C.

(57) ABSTRACT

A unit damper apparatus 18 is used as a damper apparatus 18 which absorbs an impact and a vibration conveyed from a contact 14 to a seesaw member 12, and a structure of this unit damper apparatus 18 is the structure which absorbs circular movement of the seesaw member 12 or performs the circular movement in accordance with that of the seesaw member 12, where a damper effect does not fluctuate according to an angle of inclination of the seesaw member 12.

1 Claim, 8 Drawing Sheets

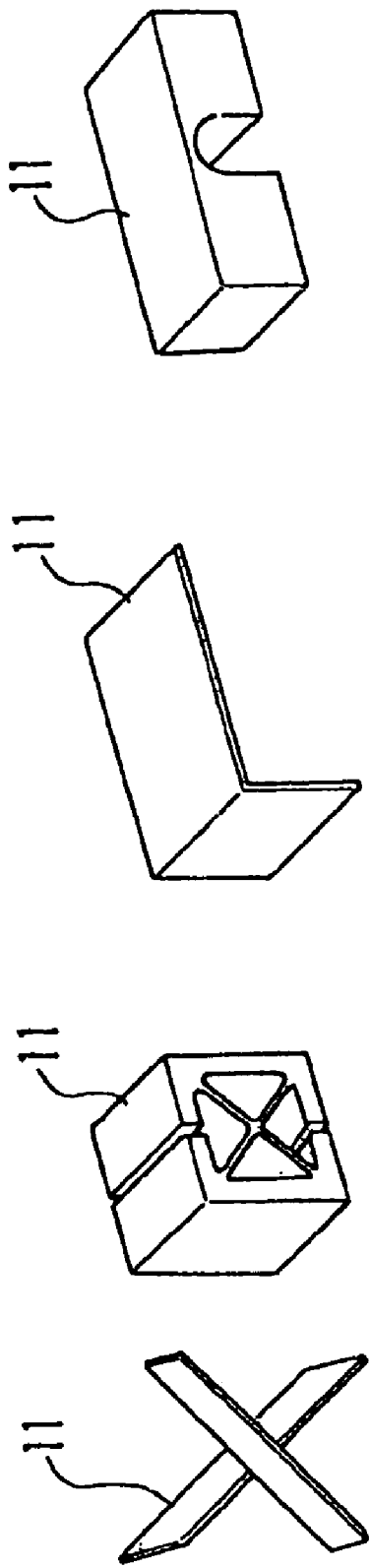
FIG.2A CROSS SPRING FULCRUM
FIG.2B L-SHAPED SPRING FULCRUM
FIG.2C ELASTICITY FULCRUM

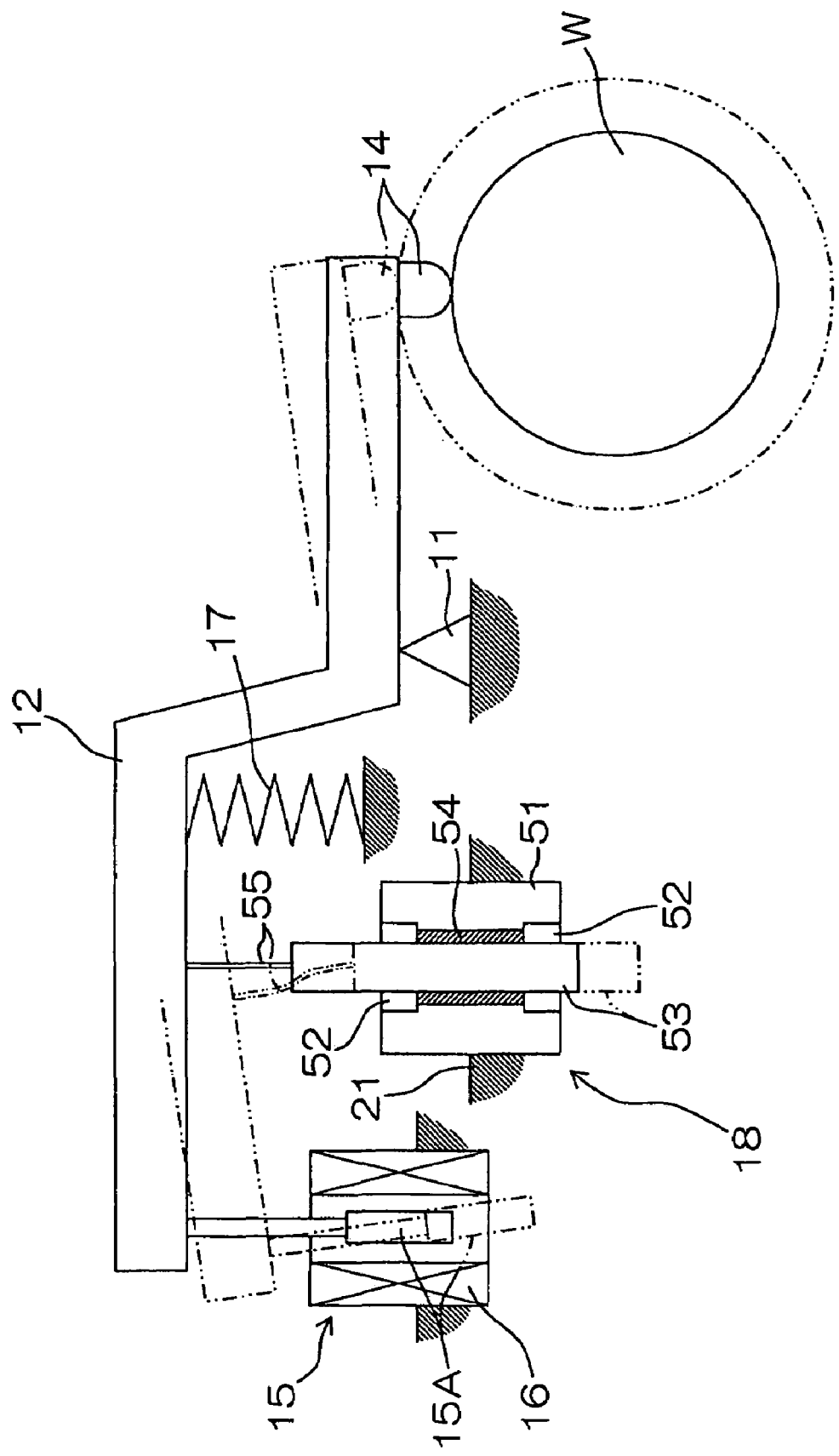

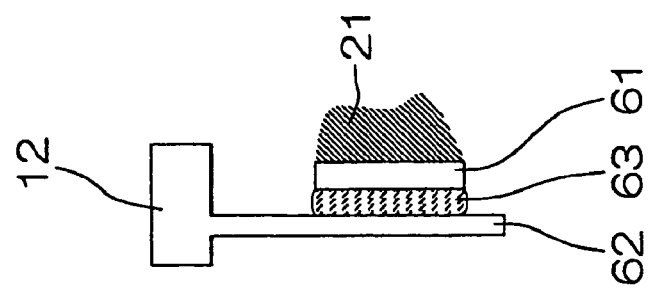
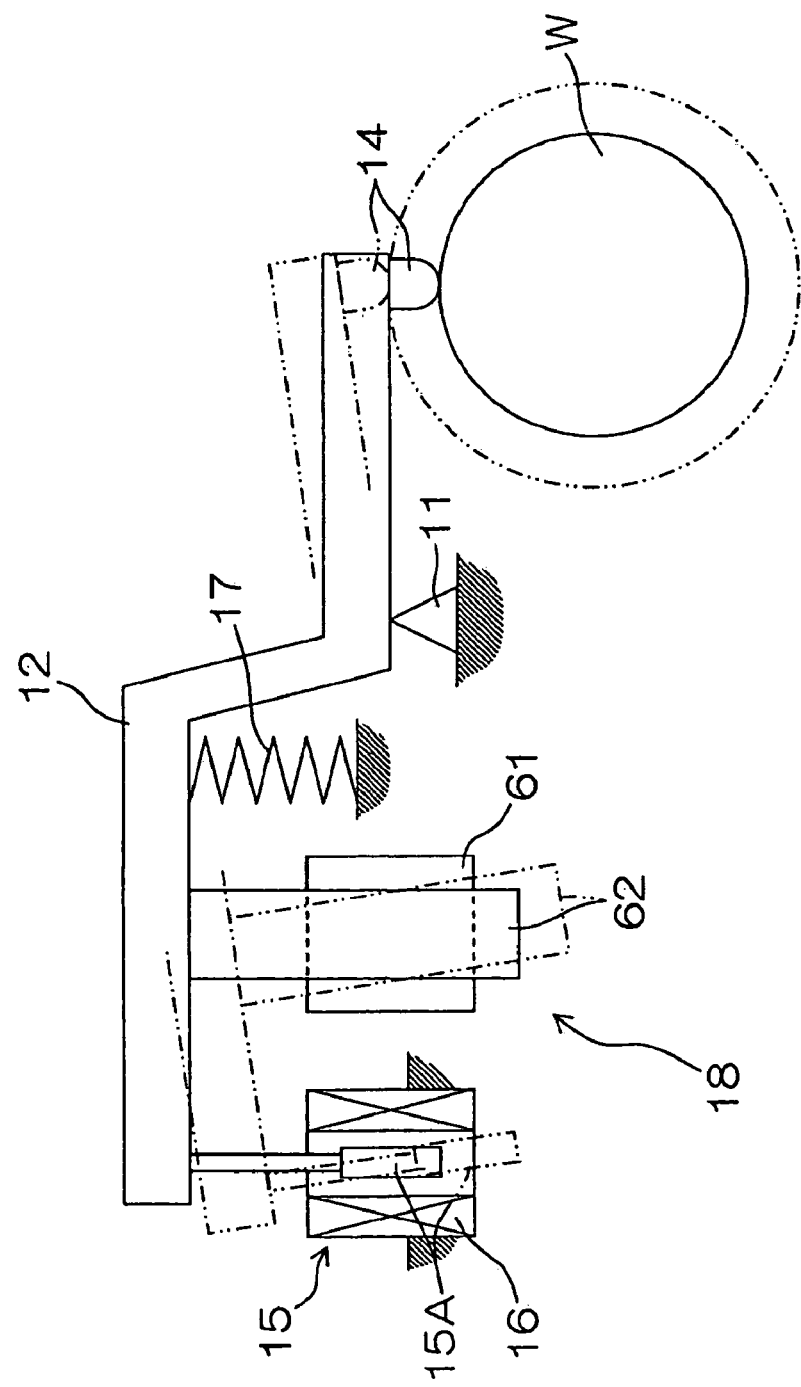

MEASURING HEAD

PRIORITY STATEMENT

This application claims the priority of U.S. patent application Ser. No. 10/872,361 (parent application), filed on Jun. 22, 2004, the disclosure of which is incorporated herein in its entirety by reference.

BACKGROUND OF THE INVENTION

1. Field of the Invention

The present invention relates to a measuring head, and in particular, to the measuring head comprising a damper apparatus which absorbs an impact and a vibration of a contact, used for a machine control gauge or a surface roughness profile shape measuring machine and so on mounted on a grinding machine and so on.

2. Description of the Related Art

As for a machine control gauge (automatic sizing device) or a surface roughness profile shape measuring machine and so on mounted on a grinding machine and so on, there is a measuring head used thereon. The measuring head comprises a seesaw member having a contact at its end and rotatably supported by a fulcrum member as its supporting point, an urging member which urges the seesaw member in one direction, and a detector provided on an opposite side to the contact with the fulcrum member in between, which detects a displacement of the contact by detecting the displacement of the seesaw member.

The detector uses a linear voltage differential transformer (commonly called differential transformer) called an LVDT (Linear Voltage Differential Transducer) comprised of a differential coil portion fixed on a measuring head proper and a core mounted on the seesaw member and inserted into the differential coil portion. A travel distance of the contact is detected as a change in voltage by the LVDT, and this value detected by the LVDT is processed by a control portion and acquired as the travel distance.

The machine control gauge is comprised of one seesaw member, and uses an L-shaped measuring head which measures the displacement at one location with one contact and a sandwiching type measuring head having two seesaw members built in as a pair and sandwiching a measured object with two opposed contacts to measure an outside diameter thereof.

The measuring head used for the machine control gauge, surface roughness profile shape measuring machine and so on has a viscous fluid such as silicone oil encapsulated therein and gives a damping force to movement of the contact in order to keep a measured value from becoming unstable due to measurement of a surface of discontinuity, surface roughness of a measuring plane, vibrations from the outside, an impact of the contact on contacting the measured object and so on.

For this reason, there are problems such as difficulty in adjustment and maintenance of the inside of the measuring head, being unable to incorporate a sensor using light such as a scale inside it, necessity of a closed structure of the entire measuring head and difficulty in adjustment of the damping force.

To solve these problems, there is a known measuring head which has an oil damper built in between the measuring head proper and the seesaw member (refer to Japanese Patent Application Publication No. 53-76483 for instance).

SUMMARY OF THE INVENTION

A measuring head described in the aforementioned Japanese Patent Application Publication No. 53-76483 has a structure as schematically shown in FIG. 8. To be more specific, a contact 114 mounted at an end of a seesaw member 112 rotating centering on a fulcrum member 111 is brought into contact with a work W by an urging member 117, and a damper apparatus 118 is provided to the measuring head which detects a displacement of the contact 114 with a detector 115.

The damper apparatus 118 is an oil damper comprised of a cylinder 121 fixed on a measuring head proper, a piston 122 fixed on the seesaw member 112 and moving in the cylinder 121 in an axial direction, a viscous fluid 123 filled in the cylinder 121, a boot 124 made of a flexible compound, provided between a piston axis portion and a cylinder opening, which seals the viscous fluid 123 in the cylinder 121 and so on.

This oil damper generates a damper effect due to viscous resistance on having the viscous fluid 123 pass through a gap between a cylinder inner circumference surface and a piston outer circumference when the piston 122 moves in the cylinder 121.

In the case of using the aforementioned oil damper for a member performing seesaw movement, however, the piston 122 moves askew inside the cylinder 121 due to circular movement of the seesaw member 112. For that reason, the gap between the cylinder inner circumference surface and the piston outer circumference must be wide, and the viscous fluid 123 of a high degree of viscosity must be used in order to enhance a damper effect.

However, there is a problem that, as inclination of the piston 122 changes according to the inclination of the seesaw member 112, the gap between the cylinder inner circumference surface and the piston outer circumference also changes so that, in the case of using the viscous fluid 123 of a high degree of viscosity, fluctuation in the damper effect is too great to perform stable measurement.

The present invention has been implemented in consideration of such circumstances, and an object thereof is to provide a measuring head capable of performing stable measurement, which allows easy adjustment and maintenance of the inside of the measuring head, enables the sensor using light such as a scale to be built inside it, requires no closed structure of the entire measuring head, facilitates the adjustment of the damping force of the impact and vibration of the contact and has little fluctuation in the damper effect.

To attain the object, the present invention is the measuring head comprising the seesaw member having the contact at its end and rotatably supported by the fulcrum member as its supporting point, the urging member which urges the seesaw member in one direction, the detector provided on an opposite side to the contact through the fulcrum member in between, which detects a displacement amount of the contact by detecting the displacement amount of the seesaw member, and is characterized in that there is the unit damper apparatus provided which absorbs the impact and vibration conveyed from the contact to the seesaw member, and the damper apparatus adds constant rotation resistance to the seesaw member.

According to the present invention, the unit damper apparatus is used as the damper apparatus which absorbs the impact and vibration conveyed from the contact to the seesaw member. Therefore, it allows the easy adjustment and maintenance of the inside of the measuring head, enables the sensor using light such as a scale to be built inside it, requires no closed structure of the entire measuring head and facilitates the adjustment of the damping force of the impact and vibration of the contact. It has a structure in which the rotation resistance does not fluctuate due to an angle of inclination of the seesaw member so that there is little fluctuation in the damper effect so as to allow the stable measurement.

As described above, according to the measuring head of the present invention, the unit damper apparatus is used as the damper apparatus which absorbs the impact and vibration conveyed from the contact to the seesaw member. Therefore, it allows the easy adjustment and maintenance of the inside of the measuring head, enables the sensor using light such as a scale to be built inside it, requires no closed structure of the entire measuring head and facilitates the adjustment of the damping force of the impact and vibration of the contact. It has a structure in which the rotation resistance is constant against the inclination of the seesaw member with no fluctuation in the damper effect and so the constant damper effect can be obtained irrespective of the positions of the contacts so as to allow the stable measurement.

BRIEF DESCRIPTION OF THE DRAWINGS

FIGS. 2A to 2C are perspective views representing various fulcrum members;

FIG. 3 is a conceptual block diagram representing a damper apparatus of a first embodiment of the measuring head according to the present invention;

FIGS. 4A and 4B are conceptual block diagrams representing the damper apparatus of a second embodiment of the measuring head according to the present invention;

DETAILED DESCRIPTION OF THE PREFERRED EMBODIMENTS

Figure 1:
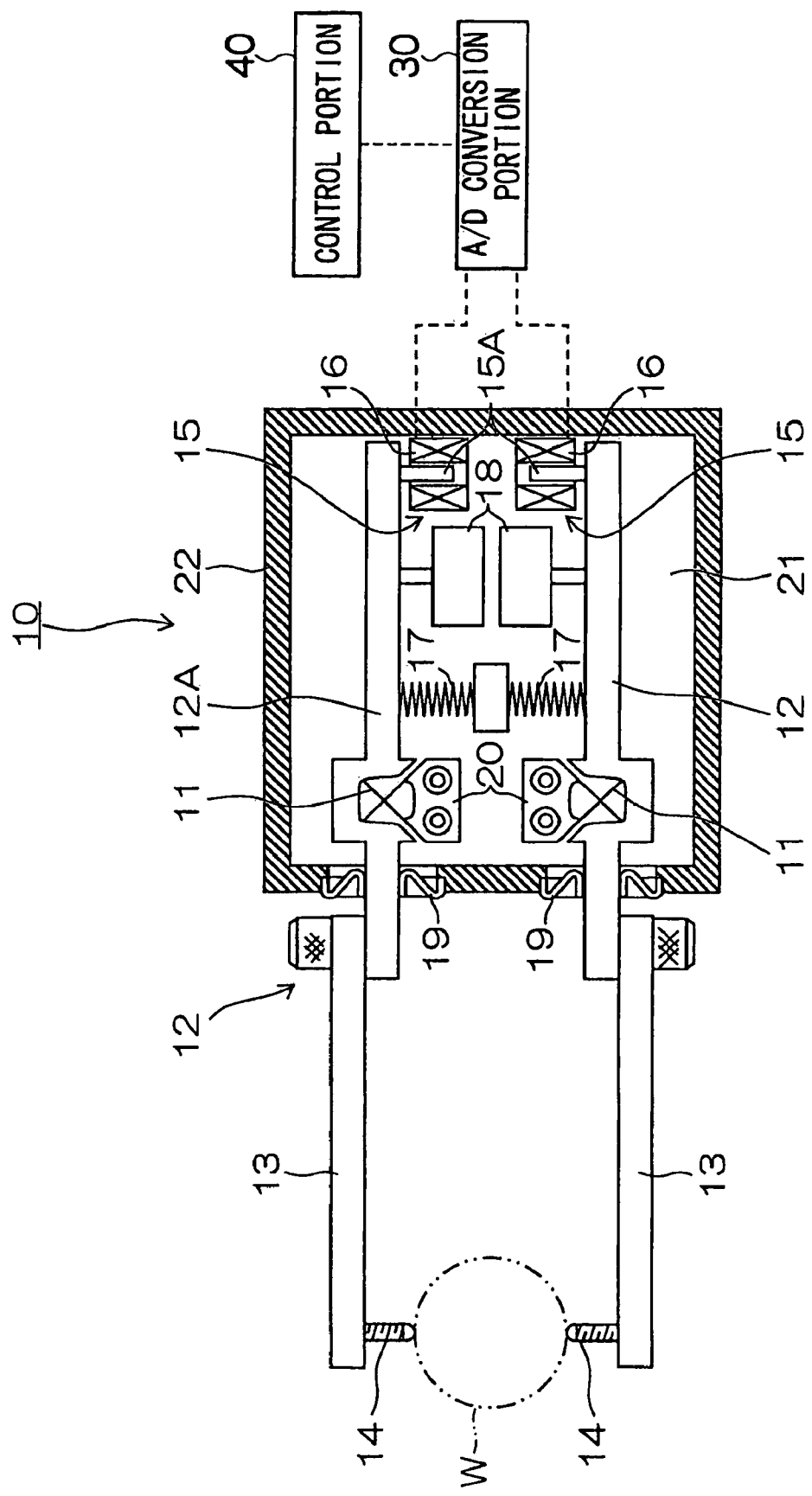
FIG. 1 is a side sectional view showing a measuring head according to an embodiment of the present invention.

Hereafter, preferred embodiments of a measuring head according to the present invention will be described in detail by referring to the attached drawings. In the drawings, the same members are given the same numbers or symbols.

FIG. 1 is a side sectional view showing an overall configuration of the measuring head according to the present invention. As shown in FIG. 1, a measuring head 10 is a sandwiching type to measure an outside diameter of a work W, and has a vertically symmetrical structure with a pair of seesaw mechanisms. Therefore, one of the seesaw mechanisms will be described.

The measuring head 10 is comprised of a measuring head proper 21, a fulcrum member 11, a seesaw member 12 consisting of an arm 12A and a finger 13, a contact 14, an LVDT (differential transformer) 15 as a detector, an urging member 17, a damper apparatus 18, a boot 19, a case 22 and so on.

The fulcrum member 11 is supported by a holder 20 and is mounted on the measuring head proper 21. The arm 12A is held by the fulcrum member 11 and is seesaw-rotatable centering on the fulcrum member 11. The finger 13 is screwed at one end of the arm 12A, and the contact 14 in contact with the work W is mounted at the end of the finger 13. A core 15A of the LVDT 15 is mounted at the other end of the arm 12A. A differential coil portion 16 of the LVDT 15 is mounted on the measuring head proper 21 by a split clamp.

The arm 12A has the urging member 17 which presses the contact toward the work W provided thereon. A compression spring is used as the urging member 17. However, various members such as an extension spring and other elastic members are applicable as long as they can generate a torque on the arm 12A. Furthermore, the arm 12A has the damper apparatus 18 provided thereon to curb a jump and a vibration of the contact 14. The damper apparatus 18 will be described in detail later.

The members other than the end of the arm 12A, the finger 13 and the contact 14 are covered by the case 22. The case 22 has an opening where the end of the arm 12A sticks out. This opening also has the boot 19 provided therein to prevent dust and mist from entering inside the case 22.

Next, operation of the measuring head 10 thus constituted will be described. First, the measuring head 10 is set for the work W. As the contact 14 is pressed against the work W by the urging member 17, it is rotatively displaced centering on the fulcrum member 11 according to dimensions of the work W. If the contact 14 is rotatively displaced, the core 15A of the LVDT 15 mounted on the arm 12A is also rotatively displaced. A displacement amount of the core 15A is detected by the differential coil portion 16 of the LVDT 15, and a detection signal is processed by an A/D conversion portion 30 and sent to a control portion 40 so as to acquire the dimensions of the work W.

In this case, the damper apparatus 18 is provided to the arm 12A, and so the jump and vibration of the contact 14 are prevented. And the case 22 has the boot 19 mounted in the opening thereof so that working fluid, mist, dust and so on will not enter inside the case 22.

Next, each portion will be described in more detail. First, the structure of the measuring head 10 proper is mounted on the case 22 as one unit in which all the major components are mounted on the measuring head proper 21.

A cross spring fulcrum as shown in FIG. 2A is used as the fulcrum member 11. As for the cross spring fulcrum, this embodiment uses the one unified by machining by a wire cut working as shown on the right side in FIG. 2A although there is a configuration in which two blade springs are arranged to cross as shown on the left side in FIG. 2A. The unified cross spring fulcrum requires a high working cost but is rigid and has good repeat accuracy, and so it suits a high-precision fulcrum.

As for the fulcrum member 11, an L-shaped spring fulcrum shown in FIG. 2B, an elasticity fulcrum shown in FIG. 2C and also bearing and pivot fulcrums and so on may be used other than the above. The L-shaped spring fulcrum is low-cost though its precision is not as high as the cross spring, and is widely used in general. Although it has a drawback of moving its fulcrum center in conjunction with circular motion, it is at a non-problematic level in the case of using the LVDT as the detector.

The elasticity fulcrum is high-precision but can take only a slight circular angle. Therefore, it can be low-costly used in the case of a narrow measurement range. A bearing fulcrum has no limit as to the circular angle, but it needs to be periodically replaced because the precision is reduced due to wear.

As shown in FIG. 1, the finger 13 is a separate body from the arm 12A and fixed on the arm 12A by screws to be replaceable according to a work shape. However, it may also be integral with the arm 12A. Stainless steel is used as a material of the finger 13. However, antirust-plated iron, ceramics and so on may also be used.

A sectional form of the finger 13 is a circular section in order to reduce influence exerted on the measurement by pressure of a coolant because, in the case of measuring the work W worked on while pouring the coolant, the coolant is also poured on the finger 13. However, it is not limited to a circular form, but a square section, an oval section and so on may also be used.

As shown in FIG. 1, a screw type contact 14 is used as the contact 14 so that it can be fine-adjusted height-wise. It is also possible to directly implant the contact 14 in the finger 13 so that it can be adjusted height-wise at a mounting portion of the finger.

Super steel or diamond is implanted at the end of the contact 14 contacting the work W. This end portion needs to be resistant to the wear, and so the super steel, diamond and ruby are generally used, which also depends on the material of the work W.

In the cases of measuring hard materials such as iron or stainless, the super steel which is low-cost is used. However, the diamond which is more resistant to the wear is used in the cases of measuring a rotative work W. In the cases of measuring soft materials such as aluminum, copper or soft glass, the diamond which is slippery is used and occurrences of a flaw and a dent are prevented by reducing a measuring force or slowing a drop speed from a retracted state.

An R form is normally used as an end form of the contact 14. While various sizes of R are used, small end forms of R0.5 to R1.5 mm or so are used especially in the case of measuring the work W being worked on in process so as not to bite chips.

In the cases where a measuring plane is rough, values may vary by picking minute roughness, and so the end form with a large R is used for the sake of equation. In such cases, a normally used end R is R3 to R6 mm or so. In the case of a soft work W, R3 mm or more is used in order to render the dent of the work W on contact smaller, and R3 to R6 mm or so is normally used.

In the case of measuring a surface of discontinuity such as a gear, it should be an R of a size striding a groove and the R parallel with the groove should be R1.5 or so, where the contact 14 ship-shaped as a whole is used.

In the case of measuring an outside diameter of a rotating gear, a small contact 14 has large amounts of drops and jumps so that measured values may vary. Therefore, it is necessary to have the structure capable of nicely getting on a mountain from a valley. Even if the structure striding the groove is provided, it is not possible to completely curb the drops and jumps, and so when it rotates faster, backlash becomes significant or it ends up jumping with little contact. Thus, it is necessary to render the damper apparatus 18 more effective and regulate peripheral speed and contact and noncontact time of the work W. As for the measurement, a method of rotating the work W more than a full circle and storing a maximum value is used.

There are also the cases where a cylindrical contact 14 made of the super steel is used. In this case, a split is made in a contact insertion hole of the finger 13 so as to fix it with the split clamp. And if the portion contacting the work W wears, it is rotated and fixed again, and an unused surface is used to extend its life. However, it is difficult to bring the cylindrical contact 14 into parallelism with the work W, and so it is used under specific conditions such as the case of being too narrow to use an R-type contact.

Next, various embodiments of the damper apparatus 18 of the measuring head according to the present invention will be described by referring to FIGS. 3 to 7. FIG. 3 represents a first embodiment. The damper apparatus 18 according to the first embodiment is comprised of a housing 51 having a through-hole fixed on the measuring head proper 21, bearing members 52 and 52 provided at both ends of the through-hole of the housing 51, a grease 54 filled in the through-hole of the housing 51, a shaft 53 guided and supported by the bearing members 52 and 52 to be capable of linear movement, and a piano wire 55 as a movement conveying member which connects the shaft 53 to the seesaw member 12.

Bearing metals are used as the bearing members 52 and 52, where the gap with the shaft 53 is 1.mu.m to 2 mu.m and the grease 54 lies in the gap so that the movement of the shaft 53 is attenuated by the viscosity of the grease 54. An intermediate portion between the bearing members 52 and 52 plays a role of a grease puddle. The material of the bearing metals should preferably be a porous compound capable of strongly holding the grease 54.

As for the grease 54, the one of which density (JIS K-2220) representing the viscosity is 250 to 300 is used. The density prescribed in JIS K-2220 is the density wherein, when the grease filled in a prescribed grease cup is kept at 25 degrees C. and a prescribed circular cone is floated for five seconds, depth of entry of the circular cone due to its own weight is represented by mm and the value ten times larger than that is the density. The grease 54 should preferably be silicone grease of which temperature dependence of the density is low. And it becomes unnecessary to use seals and so on in the bearing members 52 and 52 portion by using the grease 54 of a high density.

The piano wire 55 as the movement conveying member which connects the shaft 53 to the seesaw member 12 absorbs a difference in travel distance between circular movement and linear movement by deflection on conveying the circular movement of the seesaw member 12 to the linear movement of the shaft 53 so as to convert the circular movement to the linear movement.

It is possible to adjust a damper effect by adjusting the gap between the bearing members 52 and the shaft 53 or changing the density of the grease 54.

FIG. 4 shows a second embodiment. FIG. 4A is a side view, and FIG. 4B is a front view of the damper apparatus 18 portion. The damper apparatus 18 according to the second embodiment is comprised of a stationary plate 61, a movable plate 62 and a grease 63. The stationary plate 61 is fixed on the measuring head proper 21 in a direction orthogonal to a rotary axis of the seesaw member 12. The movable plate 62 is mounted on the seesaw member 12 in parallel to the stationary plate 61 with a slight gap with the stationary plate 61. The grease 63 is filled in between the stationary plate 61 and the movable plate 62.

As for the density representing the viscosity of the grease 63, the one having an appropriate density is used according to the size of the gap between the stationary plate 61 and the movable plate 62 and the area in which the stationary plate 61 and the movable plate 62 are overlapping. As the viscosity of the grease 63 is high, it will not drip off due to its own weight so that no seal member is required. It is desirable to use the porous compound for the stationary plate 61 and the movable plate 62 so as to improve retainability of the grease 63.

It is possible to adjust the damper effect by changing the area in which the stationary plate 61 and the movable plate 62 are overlapping, the gap between the stationary plate 61 and the movable plate 62 and the density of the grease 63. Even if the seesaw member 12 is inclined due to seesaw movement, change is slight as to the area in which the stationary plate 61 and the movable plate 62 are overlapping and rotation resistance of the seesaw member 12 is constant so that the damper effect will not change.

Figure 5:
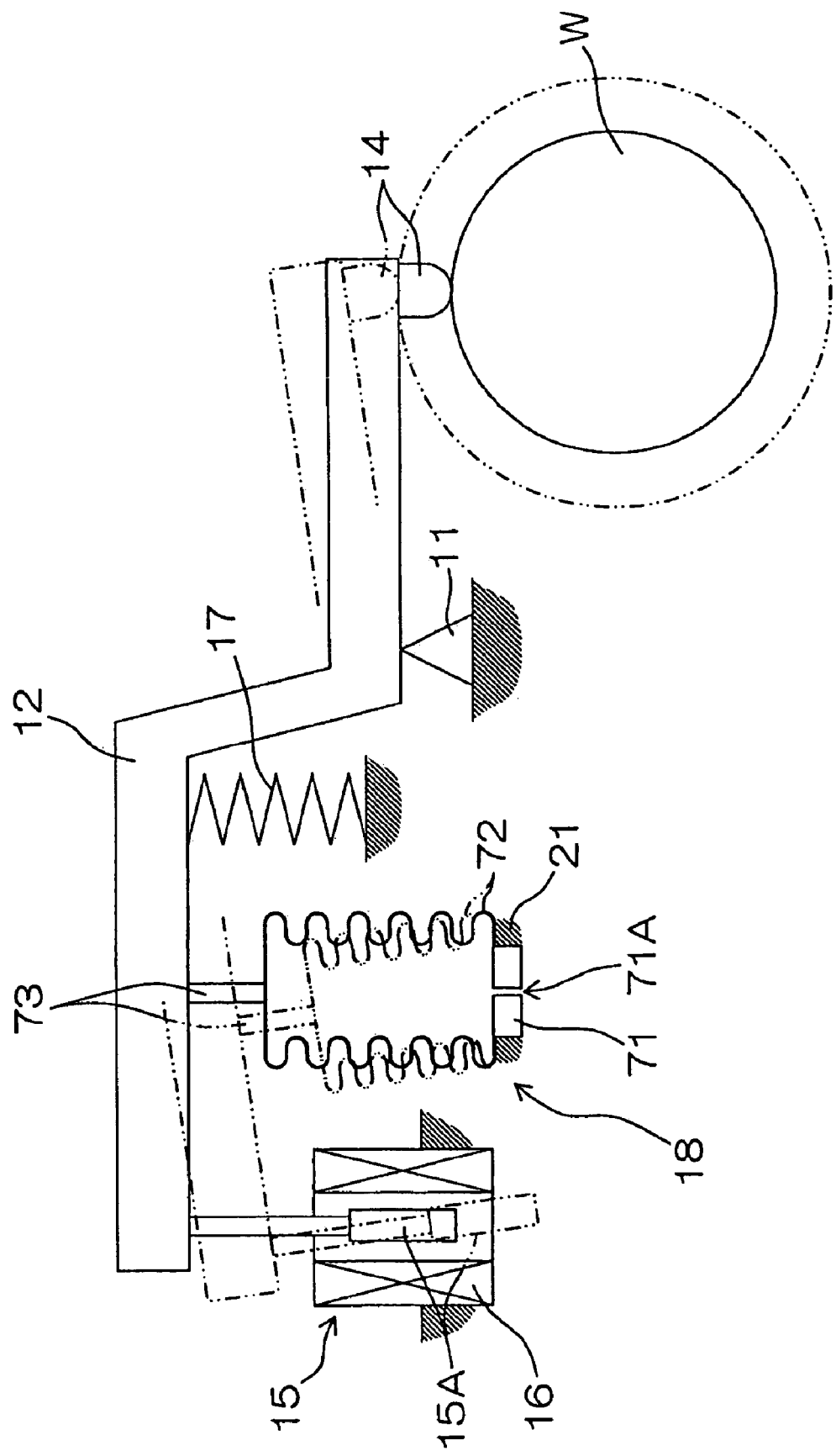
FIG. 5 is a conceptual block diagram representing the damper apparatus of a third embodiment of the measuring head according to the present invention.

FIG. 5 shows a third embodiment. The damper apparatus 18 according to the third embodiment is comprised of an orifice plate 71, a bellows 72 and a connecting rod 73. The orifice plate 71 has an orifice 71 A formed at its center and is fixed on the measuring head proper 21. The bellows 72 has one closed end and the other open end. And this opening portion of the bellows 72 is connected to the orifice plate 71. And the closed end on the opposite side to the open end of the bellows 72 is connected to the seesaw member 12 by the connecting rod 73.

If the seesaw member 12 performs the seesaw movement, the bellows 72 expands and contracts, and the air flows in and out through a passage narrowed down by the orifice 71 A so as to have the damper effect. The inclination of the seesaw member 12 is absorbed by the inclination of the bellows 72.

The material of the bellows 72 should desirably be flexible and inextensible, and a thin metal sheet and cloth-inserted rubber are suitable. A diameter of the orifice 71A is 0.1 mm or so which may be changed to adjust the damper effect.

Figure 6:
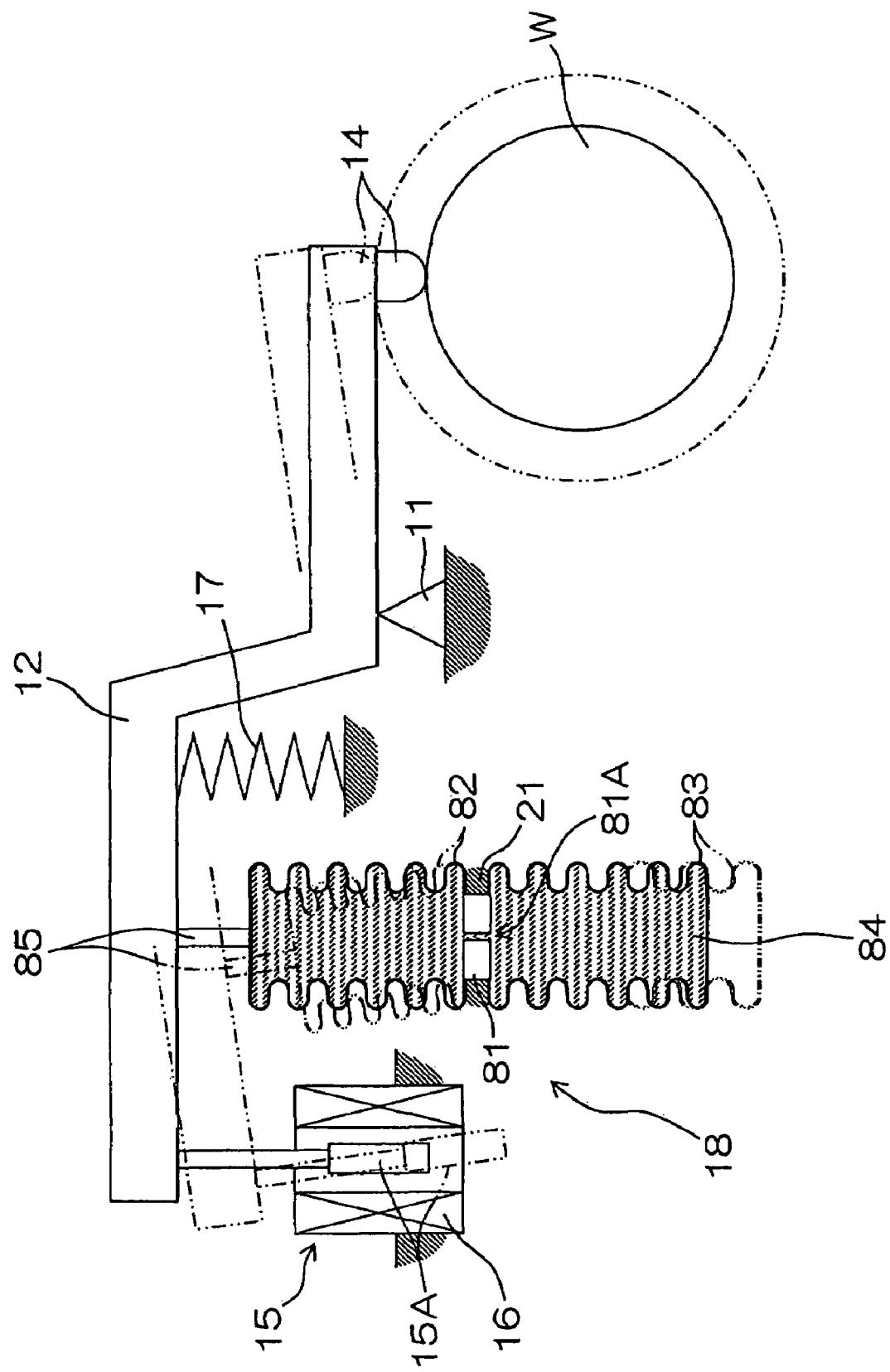
FIG. 6 is a conceptual block diagram representing the damper apparatus of a fourth embodiment of the measuring head according to the present invention.

FIG. 6 shows a fourth embodiment. The damper apparatus 18 according to the fourth embodiment is comprised of an orifice plate 81, a first bellows 82, a second bellows 83, a viscous fluid 84 and a connecting rod 85.

The orifice plate 71 has an orifice 81A formed at its center and is fixed on the measuring head proper 21. The first bellows 82 has one closed end and the other open end. And the opening portion of the first bellows 82 is connected to the orifice plate 81. And the second bellows 83 also has one closed end and the other open end, and is connected at the opening portion to the orifice plate 81 to be opposed to the first bellows 82 by sandwiching the orifice plate 81.

The insides of the first bellows 82 and the second bellows 83 are mutually connected by using the orifice 81A formed on the orifice plate 81 as the passage. The viscous fluid 84 is filled inside the first bellows 82 and the second bellows 83. And if the first bellows 82 expands and contracts, the viscous fluid 84 moves by way of the orifice 81A and the second bellows 83 inversely expands and contracts.

The closed end of the first bellows 82 and the seesaw member 12 are connected by the connecting rod 85. If the seesaw member 12 performs the seesaw movement, the bellows 82 expands and contracts, and the viscous fluid 84 flows in and out through the passage narrowed down by the orifice 81 A and the second bellows 83 inversely contracts and expands so as to have the damper effect. The inclination of the seesaw member 12 is absorbed by the inclination of the bellows 82.

The material of the first bellows 82 should desirably be flexible and inextensible, and the thin metal sheet and cloth-inserted rubber are suitable. The second bellows 83 is merely intended to hold the viscous fluid 84 coming out through the orifice 81A from the first bellows 82, and so it does not have to be the bellows but may be something like a rubber balloon.

The diameter of the orifice 81A is 0.2 mm to 0.3 mm, and an oil of which kinetic viscosity is 2,000 cSt (centistokes, $10^{-5} m^2/S$ in SI unit system) is used as the viscous fluid 84. It is possible to adjust the damper effect by changing the diameter of the orifice 81A or the kinetic viscosity of the oil or both of them. It is also possible to easily adjust the damper effect by rendering the orifice 81A as a variable aperture.

Figure 7:
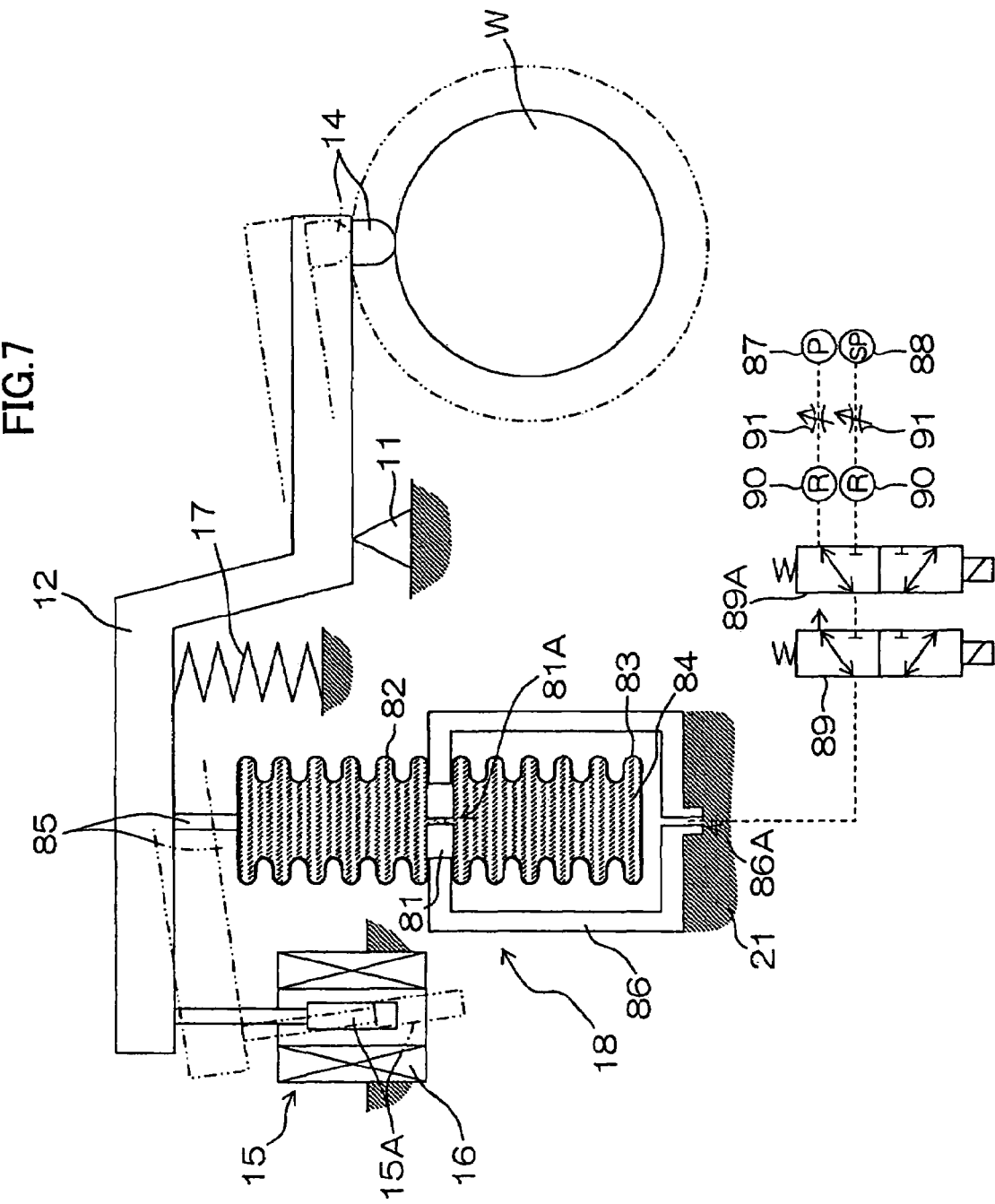
FIG. 7 is a conceptual block diagram representing the damper apparatus of a fifth embodiment of the measuring head according to the present invention.
Figure 8:
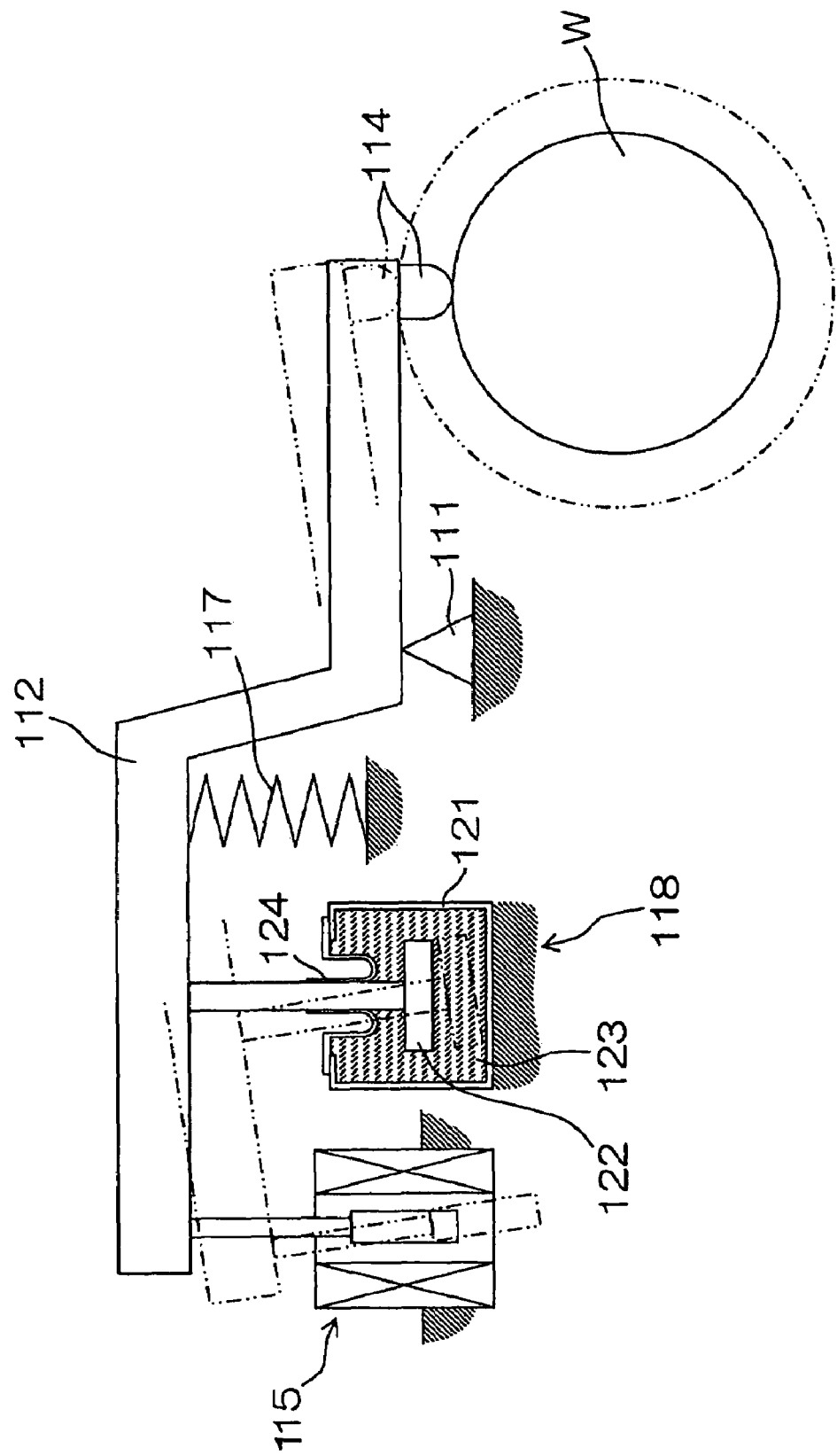
FIG. 8 is a conceptual block diagram representing the damper apparatus of the measuring head in the past.

FIG. 7 shows a fifth embodiment. The damper apparatus 18 according to the fifth embodiment uses all the members of the damper apparatus 18 described in FIG. 6 previously mentioned, and has the second bellows 83 covered by an air chamber 86. Therefore, a description of common members will be omitted.

The air chamber 86 is connected to the orifice plate 81 and fixed on the measuring head proper 21 to cover the entire second bellows 83. An opening portion 86A is formed beneath the air chamber 86, and the opening portion 86A is connected to a vacuum pump 87 which is a depressurization device and a pressurization pump 88 which is a pressurization device via magnetic valves 89 and 89A. Regulators 90 and apertures 91 are provided between the vacuum pump 87 and the magnetic valve 89A and between the pressurization pump 88 and the magnetic valve 89A respectively.

If the magnetic valves 89 and 89A are activated and the inside of the air chamber 86 is connected to the vacuum pump 87 and is depressurized, the second bellows 83 extends and the viscous fluid 84 in the first bellows 82 moves to the second bellows 83 so that the first bellows 82 shrinks. Thus, the contact 14 moves upward, and retracting operation (evacuating operation) of the contact 14 is performed. Pressure in the air chamber 86 is adjusted by a regulator 90, and retraction speed is adjusted by an aperture 91.

It is possible, by switching the magnetic valve 89A to the pressurization pump 88 side, to pressurize the inside of the air chamber 86 so as to add measuring pressure to the contact 14. The measuring pressure is adjusted by the regulator 90. If the magnetic valve 89 is activated to open the inside of the air chamber 86 to atmosphere, it operates as the damper apparatus 18 described in FIG. 6.

As for the measuring head 10 having a pair of seesaw mechanisms of a sandwiching type which measures the outside diameter of the work W as shown in FIG. 1, it is possible, by adjusting each damper apparatus 18 to provide separate damping forces to the two contacts 14 and 14 respectively, to bring the two contacts 14 and 14 into contact with the work W with a time difference. This is used, for instance, when pressing the work W against a reference plane with one contact 14 and then bringing the other contact 14 into contact with the work W to measure it.

What is claimed is:

1. A measuring head comprising:
    a seesaw member having a contact at an end and rotatably supported by a fulcrum member as supporting point;
    an urging member which urges the seesaw member in one direction;

a detector provided on an opposite side to the contact through the fulcrum member in between, which detects a displacement amount of the contact by detecting the displacement amount of the seesaw member; and a unit damper apparatus which absorbs an impact and a vibration conveyed from the contact to the seesaw member, wherein:

the damper apparatus adds constant rotation resistance to the seesaw member;

wherein the damper apparatus is comprised of:

an orifice plate fixed on a measuring head proper and having an orifice formed at its center;

a bellows having one closed end and the other open end, the latter connected to the orifice plate; and a connecting rod which couples the seesaw member to the closed end of the bellows.

* * * * *